United States Patent Office 2,820,003
Patented Jan. 14, 1958

2,820,003

COMPOSITIONS FOR SMOOTHENING METAL SURFACES AND PROCESSES FOR USING THE SAME

John E. Logan and Alexander Vujaklia, Pittsburgh, Pa., assignors to Chem-Metals, Incorporated, Pittsburgh, Pa., a corporation of Pennsylvania No Drawing. Application April 19, 1955
Serial No. 502,533

17 Claims. (Cl. 204—140.5)

This invention relates to processes for treating metal members with aqueous compositions to reduce the surface roughness of the metal members, and the aqueous compositions for accomplishing the same.

It has long been desirable to provide a chemical composition which when applied to the surfaces of a metal member will selectively remove or etch away the surface irregularities whereby to level the surface so as to reduce its roughness, thereby improving the smoothness of the surface. This is to be distinguished from pickling or other treatments which are employed to remove surface oxides, grease, dirt and other contamination mainly to produce a clean metal surface without changing the underlying surface roughness in any significant amount.

The object of the present invention is to provide an aqueous composition which when applied, either with or without the application of an electrical current, to the surface of a metal member will substantially reduce the roughness of the surface.

A further object of the invention is to provide a process for treating metal surfaces with selected aqueous compositions in order to produce a substantial smoothening thereof and render the surface brighter.

Other objects of the invention will in part be obvious and will in part appear hereinafter.

We have discovered that metal members having clean surfaces may be subjected to the action of a selected aqueous composition comprising as its essential components aqueous sulfuric acid of a specific strength and a soluble nitrite providing $NO_2$ ions, which composition will reduce the roughness of the surface by a very substantial amount in a few minutes contact therewith. Hereinafter the term "leveling" will be employed to designate the reduction of roughness of a metal surface. The roughness is determined in microinches by a suitable device, such as the brush surface analyzer.

Our invention is particularly advantageous in the treatment of metal surfaces having a roughness of up to about 100 microinches R. M. S. The metal surfaces are rendered substantially clean and free from oxides and other contamination preceding the application of the aqueous compositions of this invention. The metal to be treated is preferably degreased and cleaned either chemically as by acid pickling, anodic cleaning in an alkaline cleaner or the like, or mechanically as by sanding, polishing, or buffing and then the clean metal is immersed for a brief period of time in the compositions of this invention to produce a smoother and brighter metallic surface. The cleaning is required so that the compositions of this invention not only have a metal surface on which they will act uniformly, but also to prevent their deterioration by reacting with superficial oxides, dirt, grease and other nonmetallic matters.

More specifically, the aqueous composition of the present invention comprises as its essentially components (a) 50% to 78% aqueous sulfuric acid, and (b) a nitrite or compound providing $NO_2$ dissolved in the composition in an amount to provide from 0.1 to 2.5 ounces of $NO_2$ per gallon of the composition. Due to partial decomposition at or soon after the time of addition, we find that the $NO_2$ content as determined by titration with $KMnO_4$, will indicate less $NO_2$ than was added. The aqueous composition may comprise up to 5% of its volume of 85% orthophosphoric acid. Small amounts of the usual impurities found in commercial sources of these compounds, and in drinking water may be present without materially affecting the action of the composition. The salts of the metal being treated may be present in any amount. In use the composition is maintained at a temperature of 155° F. to 215° F., the optimum temperature being from about 180° F. to 185° F.

Clean metal members are treated by dipping or immersing in the hot aqueous composition for a period of time of from 1 to 10 minutes. Treatment for a continuous period of time appreciably greater than 10 minutes often results in an etched surface. We have found that low carbon and low alloy steels, such as 0.20% carbon steel, may be treated for periods longer than 10 minutes, for instance up to 20 minutes, without etching. After treatment, the metal members are washed in water and the surface will be leveled and usually will be much brighter. We have secured progressively improved surface leveling in metal members if they are immersed in the aqueous composition for a few minutes, withdrawn therefrom, and either washed with water or permitted to drain briefly, and then again immersed in the composition for a few minutes, withdrawn and washed, or drained, a second time, and this repeated, if desired. The first treatment with the composition produces the greatest leveling. The second dip and washing produces a further reduction in surface roughness, but to a lesser degree. The third dip, and subsequent dips, each produce a progressively smaller improvement in leveling based on the roughness of the surface before the immersion. Ordinarily two dips will be adequate for most purposes. The most convenient method of applying the composition to the metal surface is to dip the metal in the composition. However, the composition may be flowed, sprayed or otherwise applied to the metal surface.

Various nitrites and compounds capable of providing $NO_2$ ions may be introduced into the aqueous composition. As examples, we have secured good results with sodium nitrite, potassium nitrite, calcium nitrite, gaseous nitric oxide (NO), barium nitrite, sodium cobaltic nitrite $[Na_3Co(NO_2)_6]$, and dicyclohexyl ammonium nitrite. Mixtures of two or more nitrites such as for example equal parts by weight of potassium nitrite and sodium nitrite have given effective results. Using sodium nitrite we have prepared satisfactory compositions embodying as little as 0.30 ounce and as much as 2.70 ounces and more of sodium nitrite in each gallon of composition. $KMnO_4$ titration indicated 0.46 ounce of nitrite in the solution after adding 0.5 ounce of sodium nitrite, and only 2.57 ounces when 4 ounces of sodium nitrite were added to the aqueous sulfuric acid.

The compositions with substantially optimum leveling properties comprise a mixture of two volumes of 93% sulfuric acid and one volume of water, and from one to three ounces per gallon of sodium nitrite.

An immersion time of 3 to 4 minutes in this last-mentioned composition will be adequate to produce optimum leveling of a metal surface. The time of application of the hot adqueous composition to the metal surfaces to secure the maximum leveling with a given composition is inversely proportional to the concentration of the nitrite. Thus a 7 to 8 minute contact with a composition containing ½ ounce per gallon of sodium nitrite is required to secure the same reduction in roughness of a surface as may be obtained in 2 to 3 minutes with a composition containing 4 ounces per gallon of sodium nitrite.

Members of various metals may be treated with satisfactory results in the compositions of this invention. Ferrous metals of a low or moderate alloy content and particularly those having not in excess of a total of 5% alloying content have been treated with outstanding success. In particular, mild carbon steel, both hot and cold rolled, and low alloy steels having, for example, up to 0.30% carbon, up to 1.5% manganese, up to 1% silicon, up to 2.5% nickel, up to 1.5% chromium and up to 0.3% manganese, or various combinations of these or other alloying components, have been effectively smoothened. Compositions used for treating steel should not contain any appreciable amount of copper. Copper and copper base alloys also have been effectively treated to produce a smoother surface. Thus red brass and naval bronze have been effectively treated.

The aqueous acidic compositions of the present invention function effectively when applied to the members without any electrical current. However, we have found that the metal being treated may be rendered cathodic by applying electrical current thereto either continuously or intermittently. The application of electrical current to the members while in contact with the composition produces a moderate improvement in the leveling of the members beyond the improvement produced when no current is applied. The current density may be as much as 75 amperes per square foot of surface in contact with the composition.

The following examples are illustrative of the practice of the invention.

*Example I*

An aqueous sulfuric acid composition was prepared by admixing 2 parts by volume of 93% sulfuric acid and 1 part by volume of water, and then 3 ounces of sodium nitrite was dissolved in each gallon of the mixture. Titration with $KMnO_4$, indicated about 1.8 ounces per gallon of $NaNO_2$ actually present. The composition was heated to 180° F. and a cold rolled carbon steel sheet (about 0.15% carbon content) was immersed therein for 3 minutes. The steel sheet had been previously electrolytically cleaned in an alkaline cleaner, and its surface roughness after the alkaline cleaning was 26 microinches R. M. S., as measured with a brush surface analyzer. After the 3 minute immersion in the acid aqueous composition, the surface had a roughness of 17 microinches, an average improvement of about 34%, based on the original surface roughness.

Clean copper sheets of an average surface roughness of 23 microinches were dipped for 3 minutes in the composition of this Example I, the temperature being 180° F., and the surface roughness was improved by 4 microinches. The treated copper surfaces were very bright.

*Example II*

In a aqueous composition prepared as in Example I, and maintained at 180° F., there was immersed a sample of cleaned low alloy steel of a composition of 0.35% nickel, 0.65% chromium, 0.45% silicon, 0.32% copper, 0.40% manganese, 0.09% carbon, and the balance substantially all iron. The surface roughness before immersion was 19 microinches. After 3 minutes' immersion and washing with water, the surface roughness was 15 microinches.

*Example III*

In the aqueous composition of Example I, maintained at 185° F., a sheet of carbon steel having 0.1% carbon, and 0.35% manganese, was immersed and an electrical current was applied to render it cathodic at a current density of 25 amperes per square foot, applied intermittently for 5 seconds followed by an off period of 10 seconds, the anode being a sheet of stainless steel. The original surface was of a roughness of 40 microinches. After 4 minutes the sheet was removed, washed with water and its surface roughness measured. The roughness was 28 microinches—an improvement of about 30%.

*Example IV*

A clean low carbon steel panel, about 0.1% carbon, having a surface roughness of 72 microinches was immersed for 4 minutes in the composition of Example I. After withdrawal and washing with water, the surface roughness was 50 microinches, an improvement in leveling of 30%. After a second immersion of the same panel in the composition for 3 minutes, the surface roughness was 38 microinches. The panel was quite bright after the second treatment.

*Example V*

A clean low carbon steel panel of a surface roughness of 20 microinches was immersed for 4 minutes in an aqueous 70% sulfuric acid composition containing 2 ounces per gallon of sodium nitrite. After withdrawal and washing with water, its surface had a 12 microinch roughness. A second 4 minute immersion reduced the roughness to 10 microinches. The washed panel was immersed in the composition for a third time, and when withdrawn and washed, its surface roughness was 8 microinches.

We have obtained exceptionally smooth surfaces by combining the acidic treatment of metal surfaces with fine polishing. Pickled hot rolled steel sheets and cold rolled steel stock usually have a surface roughness of from 12 to 30 microinches, R. M. S. Often the steel is even rougher. For many plating operations it is desirable that the steel have an average surface roughness of 5 to 7 microinches, and in some cases the best electroplating needs surfaces of a roughness as low as 2 to 3 microinches. Flat abrasive polishing is often applied to the cold rolled steel sheet or strip in order to reduce its roughness by as much as 50%. The flat polishing comprises subjecting the sheet first to a series of rough sanding operations using abrasive sheets of 50 or 60 mesh to 100 mesh grit roughness, then applying progressively finer sanding operations—usually ending in 200 to 250 mesh grit abrasive sheet. However, no matter how carefully the polishing is done, the rough sanding using 50, 60, 80, and 100 mesh grit, leaves numerous random deep scratches, ordinarily numbering about 10 to 20 per square inch of surface, that often are from 50 to 100 microinches in depth and of a length of from a bare nick to 0.5 inch. The subsequent fine polishing cannot take away sufficient metal to remove these random deep scratches without exorbitant time and expense being required. Consequently, the abrasive polished steel stock does not have a smooth uniform surface.

We have produced an economical and rapid leveling process which comprises initially applying the aqueous acidic compositions of this invention to the clean sheet steel. Preceding the treatment with compositions of this invention, hot rolled steel is pickled to clean it, while cold rolled steel may be degreased. In 4 minutes' treatment about 0.0002 to 0.0004 inch of the surface is preferentially removed from 15 to 18 microinch roughness steel, with a reduction of 30% to 40% in roughness. Then the steel, after washing, is flat polished with abrasive belts of 150 mesh and finer grit abrasive, ending in 220 grit abrasive. The fine abrasive polished surface is of 5 to 7 microinch roughness, the deepest scratches being about 10 to 15 microinches in depth. The sheet steel so polished is excellent for most plating applications. It is far superior to the same steel sanded and polished entirely with abrasives.

A decided improvement in leveling is obtained if the fine abrasive polished steel is again treated with the aqueous acidic composition. This second treatment with the composition results in steel with a roughness of a few microinches. Thus after the second treatment steel surfaces of an original roughness of 15 to 18 microinches had a final 4 to 5 microinch surface roughness. The cost of producing such smooth, polished steel is far less than possible heretofore with any abrasive polishing procedure. The surface is exceedingly free from random and other scratches, and other defects due to abrasives.

The following examples further illustrate this feature of our invention.

*Example VI*

A steel panel was thoroughly cleaned in an aqueous alkaline solution comprising sodium carbonate. After washing and drying, its average surface roughness was measured and found to be 26 microinches. The clean steel panel was immersed for 3 minutes in a 70% aqueous sulfuric acid solution containing sufficient sodium nitrite for one cubic centimeter to decolorize 2.5 ml of 0.1 N $KMnO_4$. Approximately 0.0002 inch of metal was etched away. The panel was rinsed with water and dried. Its average surface roughness now was 20 microinches— the leveling was 6 microinches, or 23%. The steel panel was then polished with 3/0 emery paper followed by No. 2 metallographic polishing paper. After cleaning, the surface had an average roughness of 6.5 microinches. The abrasive polished steel panel was then immersed for 3 minutes in the same aqueous acidic composition at 185° F. Upon rinsing with water and drying, the surface was measured and found to have an average roughness of 5 microinches. No random or other types of scratches were observed on the surface.

*Example VII*

A cold rolled steel panel after alkali washing was measured and found to have a surface roughness of 24 microinches. A 70% sulfuric acid solution with sufficient sodium nitrite to decolorize 2.9 ml of 0.1 N $KMNO_4$ per cubic centimeter of the acidic solution, was applied at 185° F. for 3 minutes to the steel panel. After washing with water and drying the surface had an average roughness of 17 microinches—a leveling of 7 microinches or 29%. The surface was polished with 3/0 emery paper and No. 2 metallographic polishing paper until the surface had an average roughness of 8 microinches. The abrasive polished panel was again treated for 3 minutes with the same aqueous acid composition. After being washed in water and dried, the surface roughness measured 5.5 microinches—a leveling of 2.5 microinches. The total leveling was 18.5 microinches. No scratches were observed.

It will be appreciated that the aqueous composition may be prepared from any strength sulfuric acid, such as 100% or 80% sulfuric acid. In some cases aqueous sulfuric acid of the desired strength may be obtained commercially and used directly by adding the nitrite thereto. Sulfuric acid of a strength of 93%, for example, may be employed with a suitable addition of water to produce the desired acid concentration.

The metal treated in the compositions of this invention is particularly suitable for electroplating, tinning or galvanizing, or similar coating applications where its improved surface smoothness and brightness will produce a superior product.

It will be understood that thee above description is illustrative and not limiting inasmuch as obvious modifications will be apparent to those skilled in the art.

We claim as our invention:

1. In the process of treating the surfaces of a metal member selected from the group consisting of iron, ferrous base alloys, copper and copper base alloys to reduce the roughness thereof, the steps comprising applying to the surface for a period of time of from 1 to 10 minutes an aqueous composition consisting essentially of aqueous sulfuric acid of a strength of from 50% to 78%, and a soluble nitrite dissolved in the aqueous sulfuric acid to provide from 0.1 to 2.5 ounces of $NO_2$ per gallon of the composition, the aqueous composition being at a temperature of from 155° F. to 215° F.

2. The process of claim 1, wherein not over 5% of the volume of the composition comprises orthophosphoric acid.

3. The process of claim 1 wherein at the end of the period of time the member is washed with water to remove composition on its surfaces, and then the composition is reapplied to the surface for the period of time.

4. The process of claim 1 wherein the metal member being treated is ferrous metal having not over 5% of alloying components.

5. The process of claim 1 wherein the metal member comprises copper and copper base alloys.

6. The process of claim 1 wherein the member is rendered cathodic during application of the composition by applying thereto an electrical current at a current density of up to 75 amperes per square foot while in contact with the aqueous composition.

7. The process of claim 1 wherein the member is intermittently rendered cathodic during application of the composition by applying electrical current at densities of up to 75 amperes per square foot for periods of time of several seconds followed by periods of several seconds during which no electrical current is applied to the member.

8. An aqueous composition consisting essentially of (a) aqueous sulfuric acid of a strength of from 50% to 78%, and (b) a nitrite dissolved in the sulfuric acid in an amount to provide from 0.1 to 2.5 ounces of $NO_2$ per gallon of the composition.

9. The aqueous composition of claim 8, wherein the nitrite comprises from about 0.30 to 2.7 ounces per gallon of sodium nitrite, as determined by titration with $KMnO_4$.

10. In the process of treating the surfaces of clean ferrous metal member to reduce the surface roughness thereof, the steps comprising immersing the surface of the member for a period of time of from 1 to 10 minutes in an aqueous composition consisting essentially of aqueous sulfuric acid of a strength of from 50% to 78% and a soluble nitrite dissolved therein to provide from 0.1 to 2.7 ounces of $NO_2$ per gallon of the composition, the aqueous composition being at a temperature of 155° F. to 215° F., withdrawing the member from the composition at the end of this period of time, removing the aqueous composition from the surface, immersing the member again in the composition for the period of time and then withdrawing the member and washing the surface.

11. The process of claim 10, wherein the steps of immersing the member in the aqueous composition, withdrawing, and removing aqueous composition from the surfaces are repeated at least once before the washing.

12. In the process of producing a steel member with a surface of low microinch roughness and free from deep random scratches, the steps comprising applying to the surface for a period of time of from 1 to 10 minutes an aqueous composition consisting essentially of aqueous sulfuric acid of a strength of from 50% to 78%, and a soluble nitrite dissolved in the aqueous sulfuric acid to provide from 0.1 to 2.5 ounces of $NO_2$ per gallon of the composition, the aqueous composition being at a temperature of from 155° F. to 215° F., thereby leveling the surface, washing the steel member, and then polishing the member with an abrasive of a fineness of 150 mesh and finer to level the surface further.

13. In the process of producing a steel member with a surface of low microinch roughness and free from deep random scratches, the steps comprising applying to the surface for a period of time of from 1 to 10 minutes an aqueous composition consisting essentially of aqueous sulfuric acid of a strength of from 50% to 78%, and a soluble nitrite dissolved in the aqueous sulfuric acid to provide from 0.1 to 2.5 ounces of $NO_2$ per gallon of the composition, the aqueous composition being at a temperature of from 155° F. to 215° F., thereby leveling the surface, washing the steel member, then polishing the member with an abrasive of a fineness of 150 mesh and finer to level the surface further, and again treating the abrasive polished surface with the aqueous composition for a period of 1 to 10 minutes whereby to reduce the surface roughness to a few microinches.

14. In the process of leveling the surface of a clean metal member selected from the group consisting of iron, ferrous base alloys, copper and copper base alloys, the steps comprising applying to the surface for a period of time of from 1 to 10 minutes an aqueous composition consisting essentially of aqueous sulfuric acid of a strength of from 50% to 78%, and a soluble nitrite dissolved in the aqueous sulfuric acid to provide from 0.1 to 2.5 ounces of $NO_2$ per gallon of the composition, the aqueous composition being at a temperature of from 155° F. to 215° F., thereby leveling the surface, washing the surface with water, and then polishing the surface with an abrasive substantially finer than 100 mesh to level the surface further.

15. The process of claim 14 wherein the abrasive polished surface is treated at least once for a period of time of from 1 to 10 minutes with the aqueous composition to further level the surface, the treated surface being washed after each treatment with the composition.

16. The process of claim 14 wherein the abrasive polished surface is treated at least once for a period of time of from 1 to 10 minutes with the aqueous composition to further level the surface, the treated surface being drained after each treatment and washed with water after the last treatment.

17. In the process of reducing the roughness of the surface of a clean low alloy steel member, the surface having an average roughness of up to 30 microinches, to produce a smoother surface free from deep random scratches, the steps comprising applying at least once to the surface for a period of time of from 1 to 10 minutes an aqueous composition consisting essentially of aqueous sulfuric acid of a strength of from 50% to 78%, and a soluble nitrite dissolved in the aqueous sulfuric acid to provide from 0.1 to 2.5 ounces of $NO_2$ per gallon of the composition, the aqueous composition being at a temperature of from 155° F. to 215° F., thereby leveling the surface, washing with water the surface after each application, then polishing the surface with an abrasive substantially finer than 100 mesh to level the surface further, and then applying the aqueous composition at least once to the abrasive polished surface, the surface being washed with water after each application, thereby producing a surface of a roughness of less than 6 microinches and free from deep random scratches.

References Cited in the file of this patent

UNITED STATES PATENTS

| | | |
|---|---|---|
| 2,172,171 | Meyer et al. | Sept. 5, 1939 |
| 2,428,364 | Frager | Oct. 7, 1947 |

FOREIGN PATENTS

| | | |
|---|---|---|
| 511,264 | Canada | Mar. 22, 1955 |

OTHER REFERENCES

Soils—Their Properties and Management—Lyon et al. (1916), p. 130 cited, publ. by Macmillan Co., N. Y.